(12) United States Patent
Nakamura

(10) Patent No.: US 11,462,762 B2
(45) Date of Patent: Oct. 4, 2022

(54) POWER SUPPLY UNIT AND MANUFACTURING METHOD OF THE SAME

(71) Applicant: TOYOTA JIDOSHA KABUSHIKI KAISHA, Toyota (JP)

(72) Inventor: Ikuhiro Nakamura, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 175 days.

(21) Appl. No.: 16/186,845

(22) Filed: Nov. 12, 2018

(65) Prior Publication Data
US 2019/0165404 A1 May 30, 2019

(30) Foreign Application Priority Data
Nov. 27, 2017 (JP) .............................. JP2017-226544

(51) Int. Cl.
| | |
|---|---|
| *H01M 8/2475* | (2016.01) |
| *H01M 10/42* | (2006.01) |
| *H01M 50/20* | (2021.01) |
| *H01M 8/0432* | (2016.01) |

(52) U.S. Cl.
CPC ....... *H01M 8/2475* (2013.01); *H01M 10/425* (2013.01); *H01M 10/4257* (2013.01); *H01M 50/20* (2021.01); *H01M 8/04373* (2013.01); *H01M 2220/20* (2013.01); *H01M 2250/20* (2013.01)

(58) Field of Classification Search
CPC ............. H01M 8/2475; H01M 2/1016; H01M 2/1072; H01M 10/425; H01M 10/4257; H01M 8/04373; H01M 2220/20; H01M 2250/20
See application file for complete search history.

(56) References Cited

U.S. PATENT DOCUMENTS

| | | | |
|---|---|---|---|
| 2005/0074655 A1* | 4/2005 | Ariyoshi ............. | H01M 8/0247 429/430 |
| 2007/0178345 A1 | 8/2007 | Takeda et al. | |
| 2012/0295173 A1 | 11/2012 | Yamamoto | |
| 2013/0045398 A1 | 2/2013 | Katano et al. | |

(Continued)

FOREIGN PATENT DOCUMENTS

| | | |
|---|---|---|
| CN | 107134583 A | 9/2017 |
| JP | 2006196386 A * | 7/2006 |

(Continued)

OTHER PUBLICATIONS

Tanaka, JP2006196386A—Machine Translation (Year: 2006).*

*Primary Examiner* — Brian R Ohara
*Assistant Examiner* — Patrick Marshall Greene
(74) *Attorney, Agent, or Firm* — Finnegan, Henderson, Farabow, Garrett & Dunner, LLP

(57) ABSTRACT

A fuel cell unit includes a lower case and an upper case. A cell stack of multiple fuel cells is accommodated in the lower case. The upper case is coupled to the lower case. Substrates on which electronic components are implemented are mounted to an inner side of the upper case. A wall extending from a top plate of the upper case is provided between a side plate of the upper case and the substrates. When the upper case is turned, the wall prevents falling dust from adhering to the substrates.

16 Claims, 7 Drawing Sheets

(56) References Cited

U.S. PATENT DOCUMENTS

2014/0295216 A1* 10/2014 Matsuda .............. H01M 50/20
                                                                                429/7
2017/0012269 A1* 1/2017 Grzywok ............ H01M 10/482
2017/0250435 A1 8/2017 Katano et al.

FOREIGN PATENT DOCUMENTS

| | | | | |
|---|---|---|---|---|
| JP | 2006-228613 A | 8/2006 | | |
| JP | 2007-207582 | 8/2007 | | |
| JP | 2009-190438 | 8/2009 | | |
| JP | 2011119095 A * | 6/2011 | | |
| JP | 2017-152286 | 8/2017 | | |
| JP | 2017152286 A * | 8/2017 | .......... | H01M 8/2475 |
| WO | WO 2012/150629 | 11/2012 | | |

\* cited by examiner

POWER SUPPLY UNIT AND MANUFACTURING METHOD OF THE SAME

INCORPORATION BY REFERENCE

The disclosure of Japanese Patent Application No. 2017-226544 filed on Nov. 27, 2017 including the specification, drawings and abstract is incorporated herein by reference in its entirety.

BACKGROUND

1. Technical Field

The technique disclosed in the present specification relates to a power supply unit including a fuel cell or a battery and electronic components, and a manufacturing method of the same.

2. Description of Related Art

There has been known a power supply unit having a case or multiple coupled cases in which a fuel cell or a battery and electronic components are accommodated. In Japanese Patent Application Publication No. 2017-152286, International Publication No. WO 2012/150629, Japanese Patent Application Publication No. 2009-190438, and Japanese Patent Application Publication No. 2007-207582, examples of power supply units including fuel cells as power supplies are disclosed. JP 2017-152286 A discloses a fuel cell unit including: a lower case in which fuel cells are accommodated; and an upper case in which electronic components are accommodated. The upper case is coupled onto the lower case. Some of the electronic components are mounted onto a back side of a top plate of the upper case.

SUMMARY

When the power supply unit having the coupled cases as disclosed in JP 2017-152286 A is assembled, the following procedure is taken. First, the upper case is held in a posture in which the top plate faces downward and an opening faces upward. Then, the electronic components are mounted onto the back side of the top plate. Thereafter, the upper case is turned over 180 degrees. The upper case is then coupled to the lower case in which the power supply is accommodated. Along with the turning of the upper case, dust and foreign substances present in the upper case move. If the components mounted onto the back side of the top plate are substrates on which electronic components are implemented, dust and foreign substances might adhere to the electronic components that are exposed to the outside when the upper case is turned. To cope with this, provided is such a technique that, in a power supply unit including substrates mounted onto a back side of a top plate of an upper case, suppresses adhesion of dust and foreign substances to the substrates while the power supply unit is manufactured.

A power supply unit disclosed in the present specification includes: a lower case and an upper case. A fuel cell or a battery is accommodated in the lower case. The upper case is coupled to the lower case. Substrates on which electronic components are implemented are mounted to an inner side of the upper case. A wall extending from a top plate of the upper case is provided between a side plate of the upper case and the substrates. This power supply unit includes the wall to protect the substrates from dust and foreign substances when the upper case is turned. Accordingly, when the upper case is turned in the manufacturing process of the power supply unit, dust and foreign substances are unlikely to adhere to the substrates.

In order to manufacture the above-described power supply unit, an assembling step, a turnover step, and a coupling step may be provided. In the assembling step, while the upper case is held in a posture in which its inner side faces upward, the substrates are mounted to the inner side of the upper case. In the turnover step, getting through a state in which the wall is located over the substrates, the upper case is turned over in the height direction. In the coupling step, the upper case with the opening facing downward is coupled to the lower case. When the upper case is turned over as described in the turnover step, dust and foreign substances present above the substrates fall down toward the substrates during the turnover. However, the dust and the foreign substances are blocked by the wall, to thereby prevent them from adhering to the substrates.

In the power supply unit, the reactors may be disposed on the opposite side of the substrates from the wall. In addition, a terminal base to which conductors extending from the reactors are connected may be mounted to the top plate, between the substrates and the reactors. The reactors may be mounted to the top plate, and cables extending from the reactors may be fixed to a side plate of the upper case. The wall may be integrally formed with the upper case. Furthermore, the wall may be formed by a sheet member made of resin.

Details and further improvement of the technique disclosed in the present specification will be explained in the following "DETAILED DESCRIPTION OF EMBODIMENTS".

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A power supply unit of an embodiment will be described with reference to the drawings. The power supply unit of the embodiment is a fuel cell unit 2 including fuel cells as a power supply. The fuel cell unit 2 of the embodiment is used as a power supply for a traction motor, and is installed in an automobile. A case of the fuel cell unit 2 is divided into an upper case 10 and a lower case 30. A stack of multiple fuel cells is accommodated in the lower case 30, and various electronic components are accommodated in the upper case 10.

Figure 1:
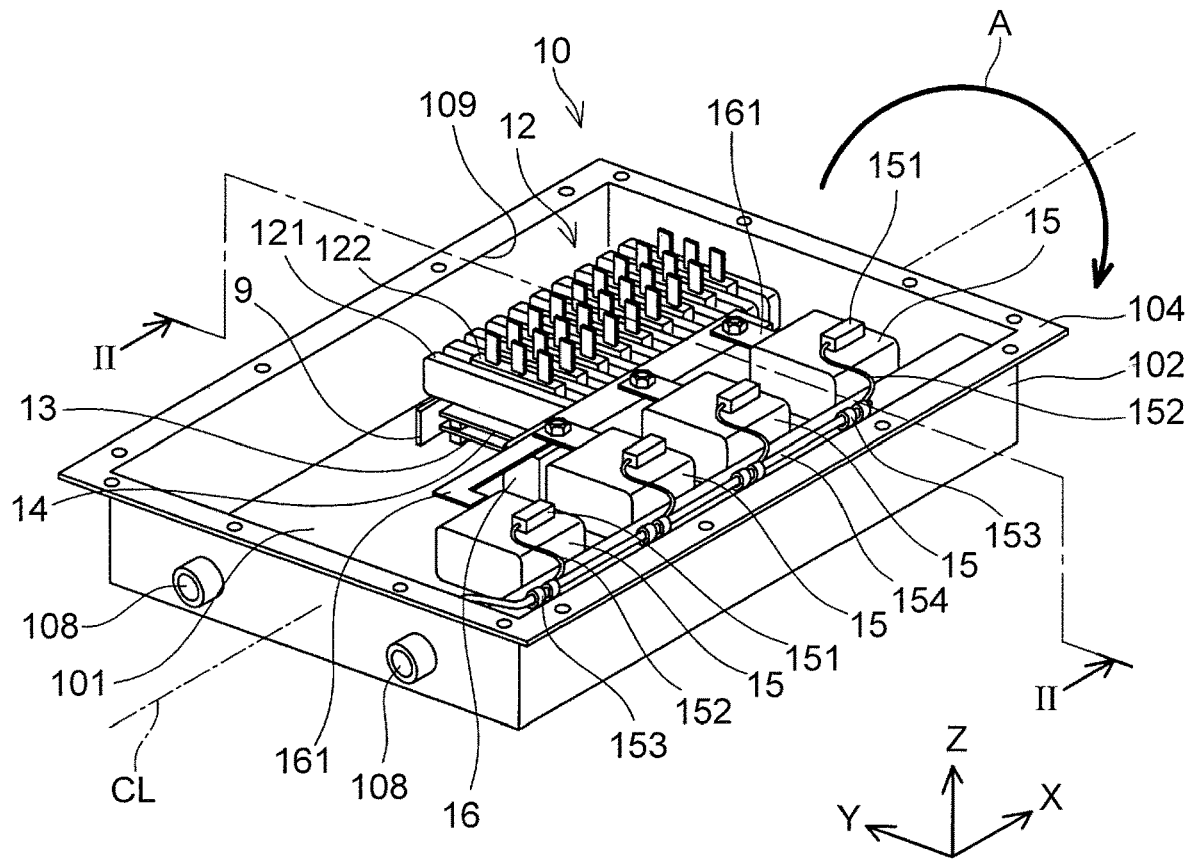
FIG. 1 is a perspective view showing a layout of components in an upper case of a fuel cell unit of an embodiment.
Figure 2:
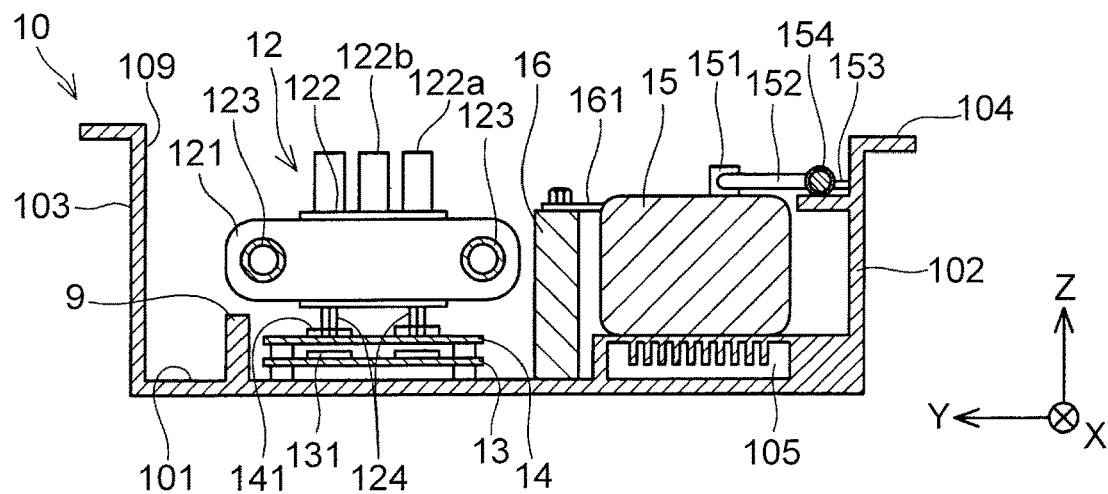
FIG. 2 is a sectional view taken along line II-II of FIG. 1.
Figure 3:
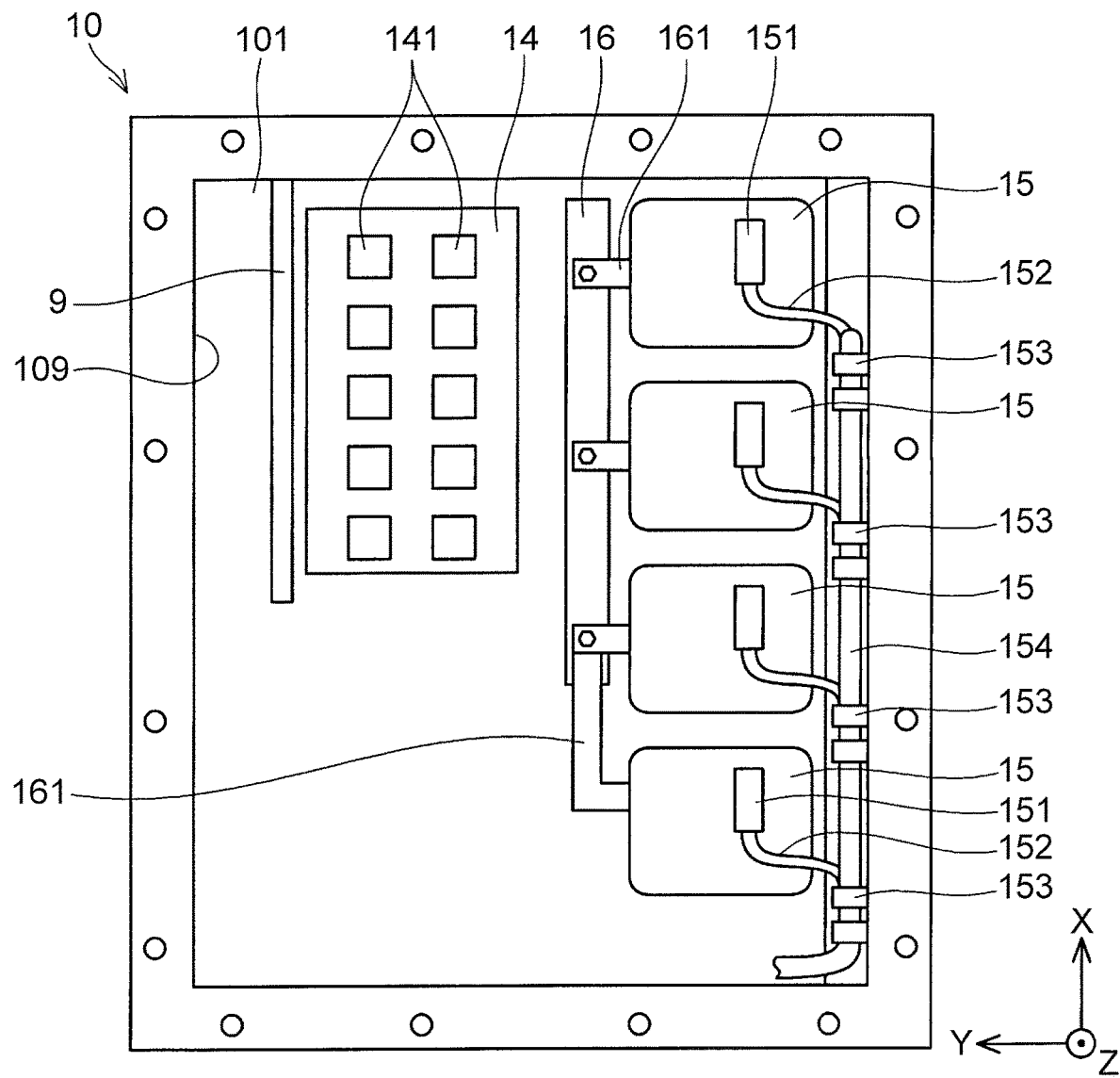
FIG. 3 is a plan view of an upper case as viewed from its opening.
Figure 4:
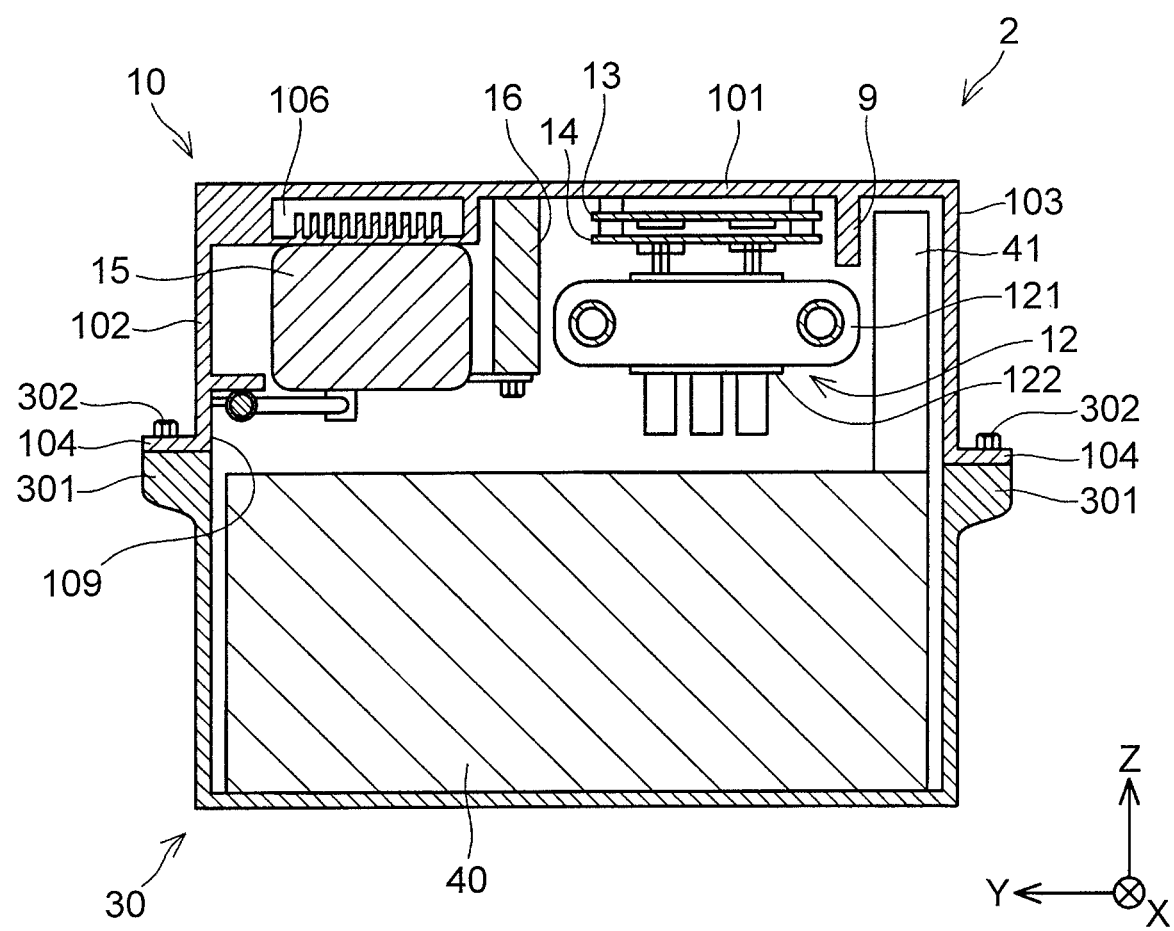
FIG. 4 is a sectional view of the fuel cell unit.

FIG. 1 shows a perspective view of the upper case 10. FIG. 2 shows a sectional view taken along line II-II of FIG. 1. FIG. 3 shows a plan view of the upper case 10 as viewed from the opening 109 side. FIG. 4 shows a sectional view of the fuel cell unit 2. Note that FIG. 1 is a perspective view showing the upper case 10 set upside down. That is, a plate appearing like a bottom plate in FIG. 1 is a top plate 101 located uppermost in the fuel cell unit 2. Each of coordinates in the drawings indicates a global coordinate system that is a coordinate not fixed to the upper case 10, and a +Z direction indicates "upward". FIG. 2 is a sectional view also showing the upper case 10 in the upside down state. In FIG. 3, for convenience of explanation, an illustration of a stack unit 12 (described later) is omitted, while a substrate 14 under the stack unit 12 is illustrated. Other electric components are accommodated at frontward positions of the stack unit 12 (in the −X direction from the stack unit 12) in FIG. 1, and below the stack unit 12 (in the −X direction from the stack unit 12) not illustrated in FIG. 3. However, in the present embodiment, for the purpose of easy understanding of the layout of the stack unit 12 and substrates 13, 14, illustrations of the other electronic components are omitted.

The manufacturing method of the fuel cell unit 2 will be described later. The upper case 10 is held with its inner side facing upward, and various components are mounted to the upper case 10. Subsequently, as indicated by a bold arrow line A of FIG. 1, the upper case 10 is turned over 180 degrees, and then the upper case 10 is coupled to a lower case (not illustrated). FIG. 4 shows a sectional view of the fuel cell unit 2 in a state in which the upper case 10 is coupled to the lower case 30. As shown in FIG. 4, in the upper case 10, the top plate 101 is located on the top of the upper case 10, and the opening 109 faces the lower case 30. As shown in FIG. 1, holes (jig holes 108) used for fixing jigs that allow the upper case 10 to be turned over are provided in side surfaces of the upper case 10.

The layout of the components in the upper case 10 will be described. Electronic components accommodated in the upper case 10 configure a step-up converter circuit to step up the output voltage of the fuel cells. The step-up converter circuit is of a chopper type, and includes several switching elements and reactors 15 as main components thereof. The output of the fuel cells greatly varies. For this reason, the fuel cell unit 2 includes a multi-phase converter. Therefore, the fuel cell unit 2 includes multiple reactors 15 corresponding to respective phases of the multi-phase converter.

The switching elements as main components of the multi-phase converter are distributed into multiple card-type power modules 122. The multiple power modules 122 and multiple card-type coolers 121 are alternately stacked one by one so as to configure the stack unit 12. In the perspective view of FIG. 1, reference numerals are added to only the power modules 122 and the coolers 121 located most frontward in this drawing, and reference numerals for the other power modules and coolers are omitted. The adjacent coolers 121 are connected to each other with connecting tubes. Although not illustrated in the drawings, the multiple coolers 121 of the stack unit 12 are connected to an external radiator of the fuel cell unit 2 through circulation passages. Coolant is circulated between the multiple coolers 121 and the radiator so as to cool the power module 122. The stack unit 12 is fixed to the frame. The frame is fixed to the upper case 10. Illustration of the frame is omitted in the drawing.

As aforementioned, the multiple reactors 15 are accommodated in the upper case 10. As shown in FIG. 2, a coolant passage 105 is formed in a part of the top plate 101 of the upper case 10. The multiple reactors 15 are mounted on the back side of the top plate 101 so as to face the coolant passage 105. Each of the reactors 15 is provided with a temperature sensor 151. A signal cable 152 of each temperature sensor 151 is fixed, via a clamper 153, to a side plate 102 among multiple side plates of the upper case 10, the side plate 102 being closer to the reactor 15. The signal cables 152 extending from the respective temperature sensors 151 of the reactors 15 are joined to a main cable 154. In the plan view of FIG. 3, an illustration of the main cable 154 is partially omitted. In addition, in FIG. 1 and FIG. 3, reference numerals for some of the components pertaining to the reactors 15 are omitted.

A bus bar 161 is connected to a coil (not illustrated) of each reactor 15. The other end of each bus bar 161 is fixed to a terminal base 16. In FIG. 1 and FIG. 3, no reference numerals are added to some of the bus bars. The bus bars 161 connected to the respective reactors 15 are connected, via the terminal base 16, to power terminals 122a, 122b of the power module 122 of the stack unit 12. In the drawings, illustrations of different bus bars that connect the terminals 122a, 122b of the power module 122 to the bus bars 161 are omitted.

The substrates 13, 14 are disposed between the stack unit 12 and the top plate 101. The substrates 13, 14 are mounted onto the back side of the top plate 101. Multiple signal terminals 124 extending from the power module 122 are connected to the substrate 14. The signal terminals 124 are gate terminals electrically connected to gates of switching elements accommodated in the power module 122, and sensor terminals of the temperature sensors that measure temperatures of the switching elements, etc. Various electronic components 131, 141 and others that realize driving circuits for the switching elements accommodated in the power module 122 are implemented on the substrates 13, 14.

The various electronic components 131, 141 and others are implemented on the substrates 13, 14. If dust and foreign substances adhere to the substrates 13, 14 on which the electronic components 131, 141 and others are implemented, the dust and foreign substances might cause malfunctions to the electronic components 131, 141 and others. In the meantime, as aforementioned, in the manufacturing step of the fuel cell unit 2, the components (including the substrates 13, 14) are mounted while the upper case 10 is held with the opening 109 facing upward. Then, the upper case 10 is turned over 180 degrees. When the upper case 10 is turned over, dust and foreign substances present in the upper case 10 might move, and these dust and foreign substances might adhere to the substrates 13, 14. For this reason, in the fuel cell unit 2 of the embodiment, there is provided a wall 9 to prevent dust and foreign substances from adhering to the substrates 13, 14 when the upper case 10 is turned over. Hereinafter, for simple explanation, "dust and foreign substances" are referred to as "dust". Typical dust is dust that adheres to the inner side of the upper case 10 in the manufacturing process.

The wall 9 is provided on the back side of the top plate 101 of the upper case 10. The wall 9 extends along the substrates 13, 14. Although the manufacturing method of the upper case 10 will be described later, the upper case 10 set upside down in the height direction is turned over 180 degrees around the rotation axis (one dot chain line CL in FIG. 1) extending in parallel to the extending direction of the wall 9. The bold arrow line A of FIG. 1 indicates the turning direction. Getting through a state in which the wall 9 is located over the substrates 13, 14, the upper case 10 is turned over.

As shown in FIG. 2, a height of the wall 9 extending from the back surface of the top plate is higher than heights of the substrates 13, 14 extending from the back surface of the top plate. As shown in FIG. 3, the length of the wall 9 is longer than lengths of the substrates 13, 14. The wall 9 has a dimension large enough to hide the substrates 13, 14 therebehind, as viewed from the opposite side of the wall 9 from the substrates 13, 14.

The wall 9 is a part of the upper case 10. The upper case 10 is formed by injection-molding aluminum. The wall 9 is formed through injection-molding at the same time of manufacturing the upper case 10.

The wall 9 extends in parallel to the rotation axis CL around which the upper case 10 is turned over. When the upper case 10 set upside down is turned over 180 degrees, the upper case 10 is turned over such that the wall 9 moves over the substrates 13, 14 around the rotation axis CL parallel to the extending direction (X-axis direction in the drawings) of the wall 9. This procedure allows the dust present above the substrates 13, 14 to fall down during the turnover. In spite of this falling, the dust is blocked by the wall 9 from adhering to the substrates 13, 14. The dust present below the substrates 13, 14 moves in a direction away from the substrates 13, 14 during the turning (turnover) of the upper case 10. Accordingly, the dust is prevented from adhering to the substrates 13, 14 as well. The wall 9 prevents dust present above the substrates 13, 14 from falling down onto the substrates 13, 14 when the upper case 10 set upside down is turned over.

With reference to FIG. 4, the layout of the components inside the lower case 30, and how the lower case 30 is coupled to the upper case 10 will be described. A cell stack 40 of multiple fuel cells are accommodated in the lower case 30. In FIG. 4, the section of the cell stack 40 is uniformly hatched, and thus an illustration of the internal structure of the cell stack 40 is omitted. The upper case 10 is coupled onto the top of the lower case 30 with the opening 109 facing toward the lower case 30 side. A flange 104 is formed around the opening 109 of the upper case 10. The upper case 10 is disposed on the lower case 30 such that the flange 104 meets a flange 301 of an opening of the lower case 30. The both flanges of the upper case 10 and the lower case 30 are coupled to each other with multiple bolts 302.

A cell monitor unit 41 is attached onto the top of the cell stack 40 of the fuel cells. The cell monitor unit 41 is a device to monitor voltage of the fuel cells. The upper part of the cell monitor unit 41 extends to the inner side of the upper case 10, so that a part of this upper part enters a space between the side plate 103 and the wall 9 of the upper case 10. In FIG. 4, the cell stack 40 and the cell monitor unit 41 are schematically illustrated, and thus illustrations of signal wires extending from the respective components are omitted.

The manufacturing method of the fuel cell unit 2 will be described with reference to FIG. 5 to FIG. 8.

Assembling Step

Figure 5:
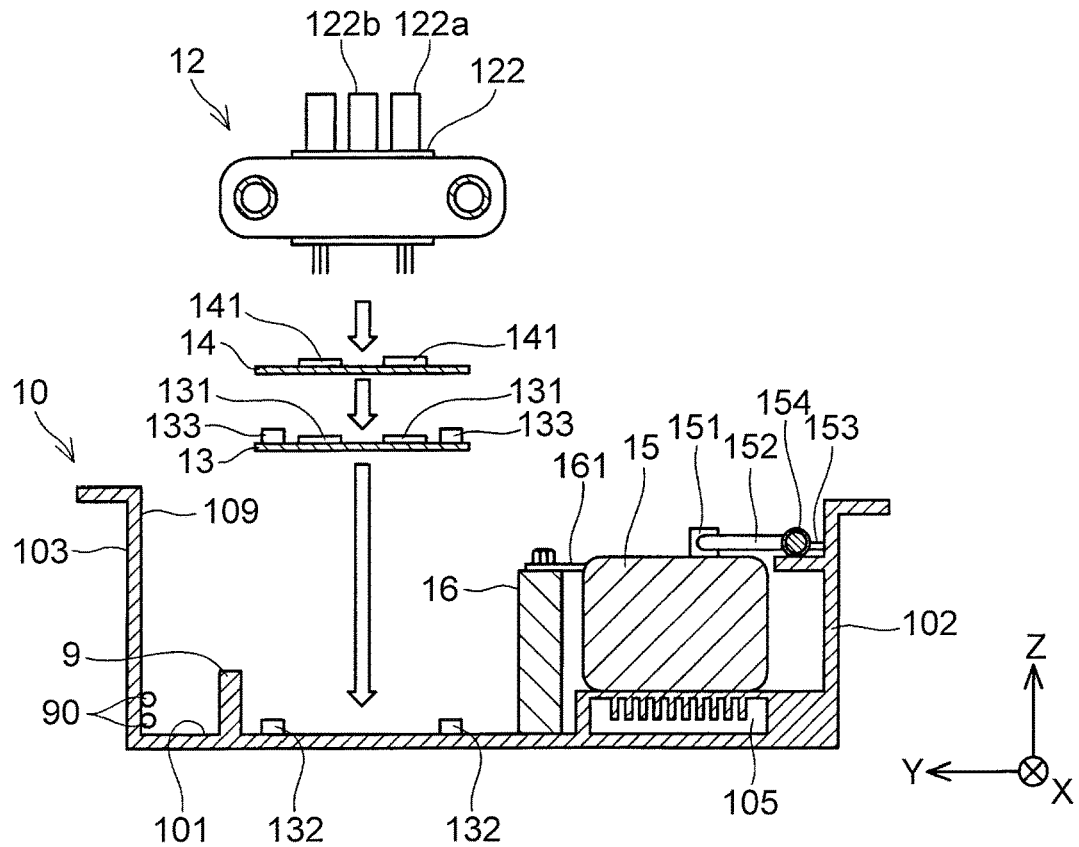
FIG. 5 is a view explaining a manufacturing method of the fuel cell unit.

As shown in FIG. 5, the upper case 10 is held with the top plate 101 facing downward and the inner side of the upper case 10 facing upward; and in this state, the substrates 13, 14 and the other components are assembled to the upper case 10. FIG. 5 shows that the reactors 15 are already mounted. The signal cables 152 extending from the temperature sensors 151 are fixed to the side plate 102 with the clampers 153. The bus bars 161 extending from the respective reactors 15 are fixed to the terminal base 16. The bus bars 161 are connected, via different bus bars, to the power terminals 122a, 122b of the power module 122 at the terminal base 16. Illustrations of the different bus bars are omitted in the drawings.

The substrate 13 is fixed onto the back side of the top plate 101 via first spacers 132, and the substrate 14 is fixed onto the substrate 13 via second spacers 133. The multiple electronic components 131 are previously implemented on the substrate 13. The multiple electronic components 141 are previously implemented on the substrate 14. The substrates 13, 14 are located between the wall 9 and the terminal base 16 and fixed onto the back side of the top plate 101. The terminal base 16 is fixed onto the back side of the top plate 101. There is no clearance between the terminal base 16 and the top plate 101.

Even if the dust 90 adheres to a part of the upper case 10 between the side plate 103 and the wall 9, the dust 90 is prevented by the wall 9 from adhering to the substrates 13, 14 during the turnover of the upper case 10. This will be described as follows.

Turnover Step

Figure 6:
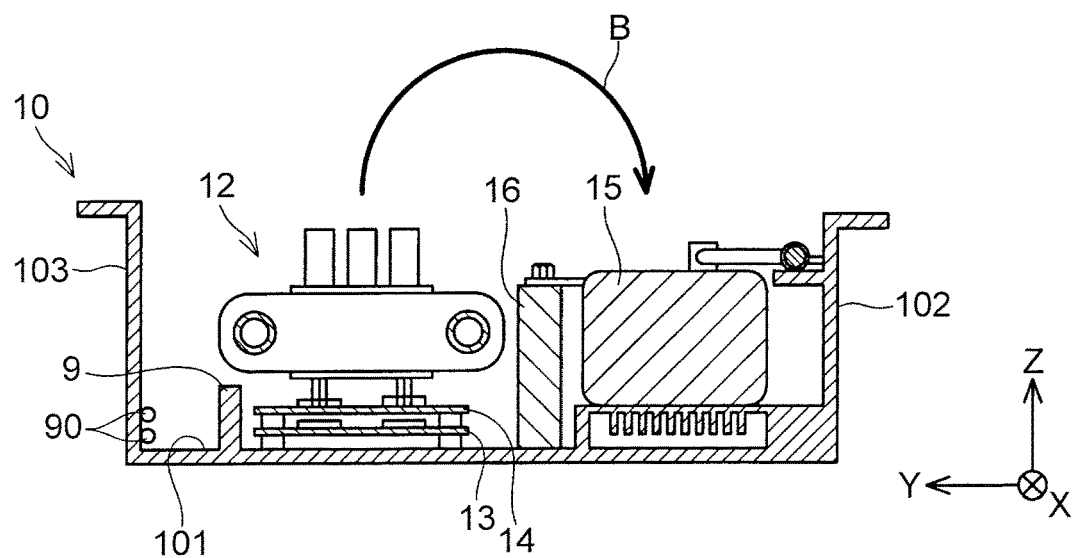
FIG. 6 is a view explaining the manufacturing method of the fuel cell unit.

FIG. 6 is a sectional view of the upper case 10 to which the components are assembled. FIG. 6 shows that the upper case 10 is held in a state of being upside down in the height direction. In the turnover step, the upper case 10 set upside down in the height direction is turned over 180 degrees. As shown in FIG. 1, the rotation axis CL extends in the direction parallel to the X-axis. In other words, the rotation axis CL extends in the direction parallel to the extending direction of the wall 9. A bold arrow line B of FIG. 6 indicates the direction of the turnover.

Figure 7:
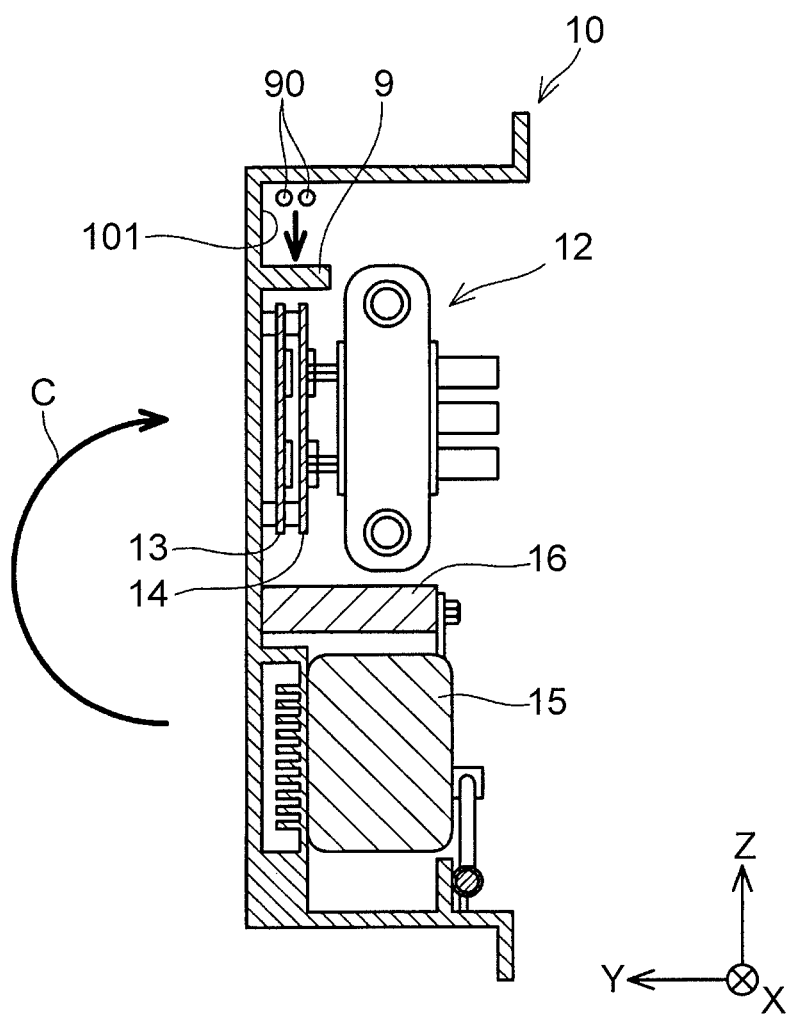
FIG. 7 is a view explaining the manufacturing method of the fuel cell unit.

FIG. 7 is a drawing showing the upper case 10 on the way of the turnover. FIG. 7 shows a state in which the upper case 10 is turned over 90 degrees from the state shown in FIG. 6. The upper case 10 is turned over such that the wall 9 moves over the substrates 13, 14. When the upper case 10 is turned over 90 degrees, the wall 9 is located right above the substrates 13, 14. When the dust 90 perpendicularly falls down (in the −Z direction), the dust 90 is blocked by the wall 9 so as not to reach the substrates 13, 14. That is, the wall 9 can prevent the dust from adhering to the substrates 13, 14 during the turning.

During the turning, dust present below the substrates 13, 14 moves in the direction away from the substrates 13, 14 due to the turning, and thus the dust is prevented from adhering to the substrates 13, 14. Even when the dust present below the substrates 13, 14 is whirled up, the terminal base 16 extending along the substrates 13, 14 functions as a wall to prevent the dust from adhering to the substrates 13, 14.

The upper case 10 is further turned over 90 degrees from the state shown in FIG. 7. A bold arrow line C of FIG. 7 indicates the direction of the turning. That is, in the turnover step, getting through the state (state shown in FIG. 7) in which the wall 9 is located over the substrates 13, 14, the upper case 10 is turned over in the height direction.

Coupling Step

Figure 8:
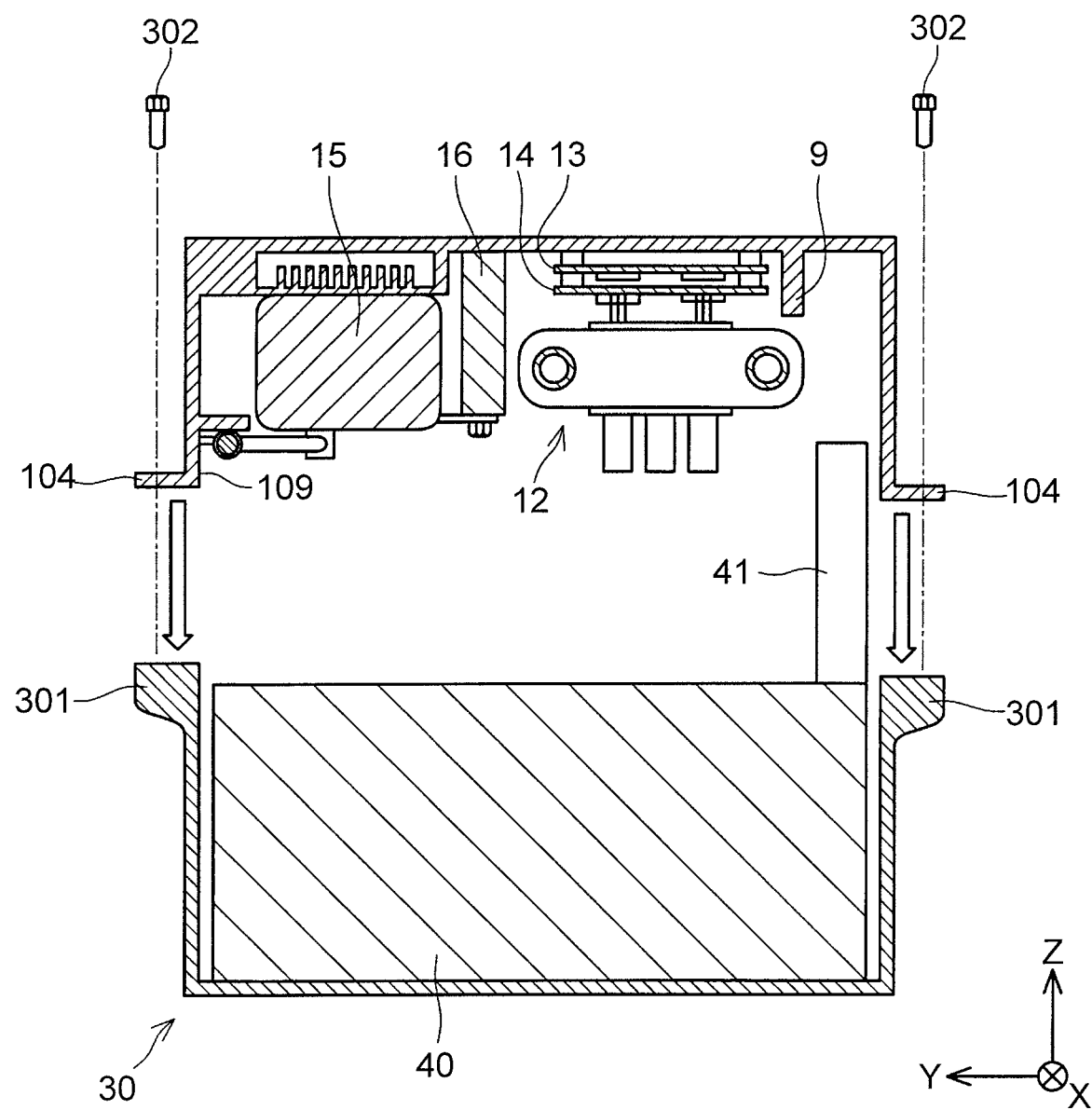
FIG. 8 is a view explaining the manufacturing method of the fuel cell unit.

FIG. 8 shows a sectional view of the upper case 10 turned over and the lower case 30. When the upper case 10 is turned over, the opening 109 faces downward. The upper case 10 with the opening 109 facing downward is disposed on the lower case 30. A flange surface of the flange 104 of the upper case 10 and a flange surface of the flange 301 of the lower case 30 are brought to meet each other, and the both surfaces are then fixed to each other with bolts 302. In this manner, the fuel cell unit 2 is completed.

Figure 9:
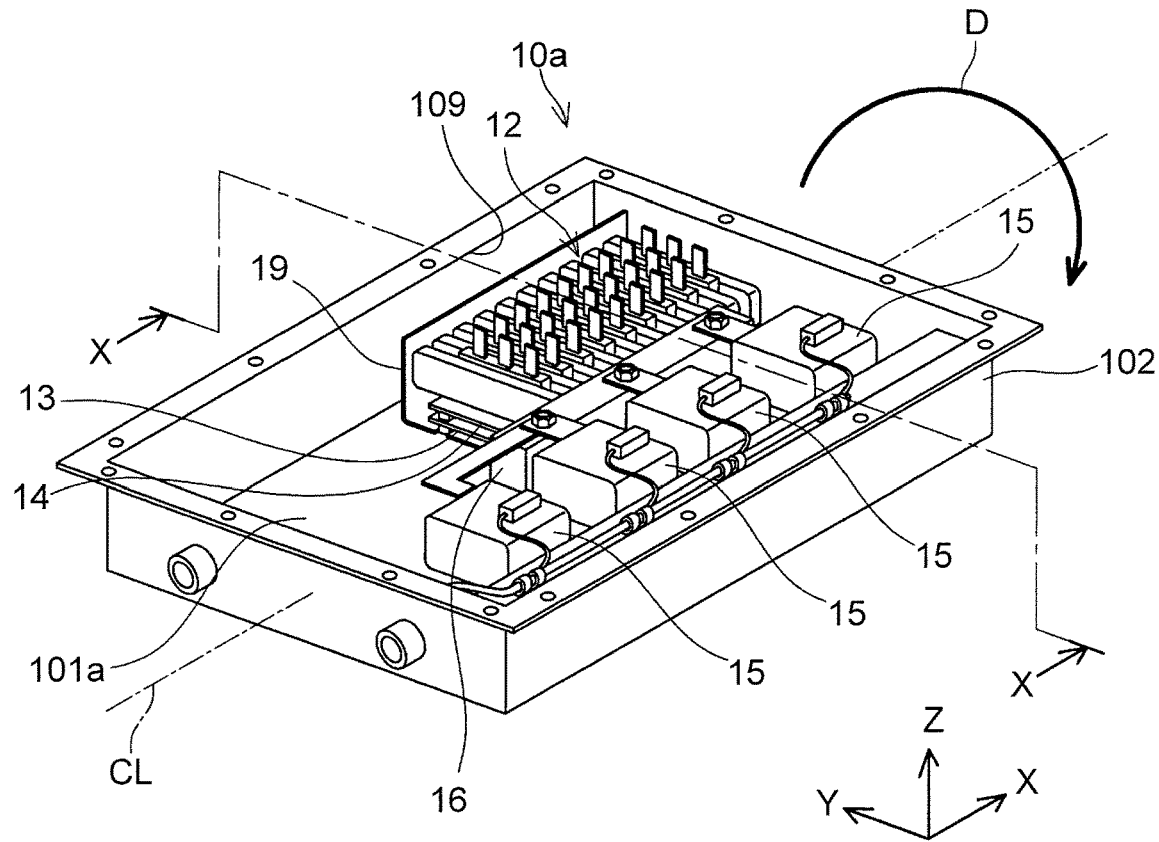
FIG. 9 is a perspective view showing an layout of components in an upper case of a modification.
Figure 10:
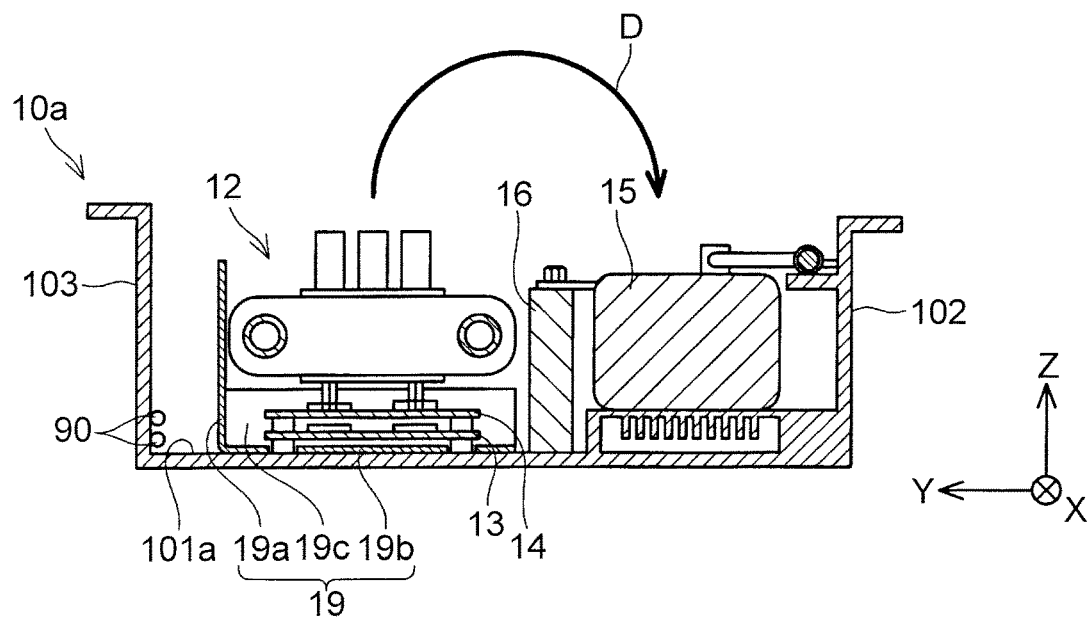
FIG. 10 is a sectional view taken along line X-X of FIG. 9.

An upper case 10*a* of a modification will be described with reference to FIG. 9 and FIG. 10. FIG. 9 is a perspective view showing a layout of components in the upper case 10*a* of the modification. FIG. 10 is a sectional view taken along line X-X of FIG. 9. FIG. 9 and FIG. 10 each show the upper case 10*a* set upside down.

In the upper case 10*a* of the modification, a wall 19 is formed by a sheet-like member made of resin. The wall 19 includes a top-plate facing portion 19*b*, a dust protecting portion 19*a*, and a back surface portion 19*c*. The top-plate facing portion 19*b* faces a back surface of the top plate 101*a*. The dust protecting portion 19*a* is bent from the edge of the top-plate facing portion 19*b* at a substantially right angle. The back surface portion 19*c* intersects the top-plate facing portion 19*b* and the dust protecting portion 19*a* at a substantially right angle, respectively. The dust protecting portion 19*a* is located between the substrates 13, 14 and the side plate 103, and extends from the top plate 101*a* in generally parallel to the side plate 103. The top-plate facing portion 19*b* is located between the top plate 101*a* and the substrates 13, 14. During the assembly of the fuel cell unit 2, the upper case 10*a* is held with the top plate 101*a* facing downward and the opening 109 facing upward, and in this state, the substrates 13, 14 and other components are assembled onto the back side of the top plate 101*a*. The wall 19 is fixed onto the back side of the top plate 101*a* at the same time. Subsequently, getting through the state in which the wall 19 is located over the substrates 13, 14, the upper case 10*a* is turned over in the height direction. A bold arrow line D of FIG. 10 indicates the turning direction. During the turnover, the dust 90 present between the wall 19 and the side plate 103 is blocked by the wall 19 when falling down, thus to be prevented from adhering to the substrates 13, 14. The upper case 10*a* having the wall 19 exerts the same operational effect as that of the upper case 10.

The technical features explained in the embodiment will be summarized as below. The fuel cell unit 2 includes the lower case 30 and the upper case 10 (10*a*). The cell stack 40 of the multiple fuel cells is accommodated in the lower case 30. The upper case 10 (10*a*) is coupled to the top part of the lower case 30 so as to be coupled to the lower case 30 (such that the opening 109 is coupled to the inner side of the lower case 30). The substrates 13, 14 are mounted onto the back side of the top plate 101 of the upper case 10 (10*a*). The electronic components 131, 141 are implemented on the substrates 13, 14, and adhesion of dust might cause malfunction to these electronic components. The wall 9 (wall 19) is provided on the back side of the top plate 101 of the upper case 10 so as to extend along the substrates 13, 14. The wall may be integrally formed with the upper case 10, as similar to the wall 9. The wall may be formed by a sheet-like member made of resin, as similar to the wall 19. The components such as the substrates 13, 14 are mounted to the upper case 10 (10*a*) with the inner side of the upper case 10 (10*a*) facing upward. The upper case 10 (10*a*) is turned over 180 degrees so as to be coupled to the lower case 30. The wall 9 (wall 19) extends in parallel to the axis (axis CL of FIG. 1) around which the upper case 10 (10*a*) is turned over. Getting through the state in which the wall 9 (wall 19) is located over the substrates 13, 14, the upper case 10 (10*a*) is turned over. In the turnover of the upper case 10 (10*a*), dust present above the substrates 13, 14 is blocked by the wall 9 (wall 19) when falling down, thus to be prevented from adhering to the substrates 13, 14.

Other technical features of the technique described in the embodiment will be described. The reactors 15 are disposed in the upper case 10 (10*a*) and on the opposite side of the substrates 13, 14 from the wall 9 (wall 19). When the upper case 10 (10*a*) is turned over, the reactors 15 move below the substrates 13, 14. When foreign substances adhering to the reactors 15 fall down, they move in a direction away from the substrates 13, 14. This means that the foreign substances adhering to the reactors 15 do not adhere to the substrates 13, 14 when the upper case 10 (10*a*) is turned over.

The terminal base 16 to which the bus bars 161 (conductors) extending from the respective reactors 15 are connected is mounted to the top plate 101, at a position between the substrates 13, 14 and the reactors 15. The terminal base 16 extends along the substrates 13, 14. The terminal base 16 extends in parallel to the rotation axis around which the upper case 10 (10*a*) is turned over. No clearance is provided between the terminal base 16 and the top plate 101. The terminal base 16 located on the opposite side from the wall 9 (wall 19) serves as a wall to protect the substrates 13, 14. During the turning of the upper case 10 (10*a*), even when dust present below the substrates 13, 14 is whirled up, the terminal base 16 blocks the dust. Accordingly, the dust is prevented from adhering to the substrates 13, 14.

The electric cables (signal cables 152) extending from the reactors 15 are fixed to the side plate 102 of the upper case 10 (10*a*). The reactors 15 have a large calorific value. The electric cables (signal cables 152) are fixed to the side plate 102 on the lateral side of the reactors 15, to thereby suppress increase in temperature of the electric cables (signal cables 152) resulting from heating of the reactors 15.

The wall 19 formed by the sheet-like member made of resin has a lighter weight than that of the wall 9 integrally formed with the upper case 10. Accordingly, it is possible to promote weight reduction of the fuel cell unit by employing the sheet-like member made of resin.

In the fuel cell unit 2, the cell stack 40 is accommodated in the lower case 30, and the various electronic components are accommodated in the upper case 10. The fuel cell unit 2 includes no intermediate plate to partition the upper case 10 from the lower case 30. Because of having no intermediate plate, the height of the fuel cell unit 2 can be lowered.

Remarks regarding the technique described in the embodiment will be described. The components accommodated in the upper case 10 (10*a*) of the embodiment are electronic components mainly configuring the step-up converter circuit. The electronic components configuring the driving circuit of the step-up converter are implemented on the substrates 13, 14. However, any type of electronic components may be implemented on the substrates 13, 14.

The power supply unit of the embodiment is a fuel cell unit including fuel cells. The technique disclosed in the present specification may be applied to a power supply system in which a battery is accommodated, instead of the fuel cells.

The specific examples of the present disclosure have been described above in detail, but these are merely exemplifications, and should not limit the scope of the claims. The art described in the claims includes those obtained by modifying and altering the specific examples exemplified above in various manners. The technical elements described in the present specification or the drawings are technically useful alone or in various combinations, and should not be limited to the combinations described in the claims at the time of the filing of the application. Besides, the art exemplified in the present specification or the drawings can achieve a plurality of objects at the same time, and is technically useful by achieving one of the objects itself.

What is claimed is:

1. A power supply unit comprising:
    a lower case in which a fuel cell or a battery is accommodated; and
    an upper case containing substrates that are mounted to an inner side of a top plate of the upper case, wherein the top plate of the upper case is a solid plate with no openings therethrough, electronic components being implemented on the substrates, the upper case being coupled to the lower case,
    wherein a wall extending from the top plate of the upper case to a free end is provided between a side plate extending from the top plate of the upper case and the substrates, and
    wherein no wall is disposed between the lower case and the substrates.

2. The power supply unit according to claim 1, wherein reactors are disposed on an opposite side of the substrates from the wall extending from the top plate.

3. The power supply unit according to claim 2, wherein a terminal base is mounted to the top plate at a position between the substrates and the reactors, and conductors extending from the reactors are connected to the terminal base.

4. The power supply unit according to claim 2, wherein the reactors are mounted to the top plate, and cables extending from the reactors are fixed to a side plate of the upper case.

5. The power supply unit according to claim 1, wherein the wall extending from the top plate is integrally formed with the upper case.

6. The power supply unit according to claim 1, wherein the wall extending from the top plate is formed by a sheet member made of resin.

7. A manufacturing method of a power supply unit, the power supply unit including:
    a lower case in which a fuel cell or a battery is accommodated;
    an upper case containing substrates that are mounted to an inner side of a top plate of the upper case, wherein the top plate of the upper case is a solid plate with no openings therethrough, electronic components being implemented on the substrates, the upper case being coupled to the lower case; and
    a wall extending from the top plate of the upper case to a free end, the wall being provided between a side plate extending from the top plate of the upper case and the substrates,
    the manufacturing method comprising:
        holding the upper case with the inner side of the upper case facing upward, and fixing the substrates to the upper case;
        turning over the upper case in a height direction after the upper case gets through a state in which the wall is located over the substrates; and
        coupling the upper case to the lower case, wherein no wall is disposed between the lower case and the substrates when the upper case is coupled to the lower case.

8. The manufacturing method of the power supply unit according to claim 7, wherein reactors are disposed on an opposite side of the substrates from the wall extending from the top plate.

9. The manufacturing method of the power supply unit according to claim 8, wherein a terminal base is mounted to the top plate at a position between the substrates and the reactors, and conductors extending from the reactors are connected to the terminal base.

10. The manufacturing method of the power supply unit according to claim 8, wherein the reactors are mounted to the top plate, and cables extending from the reactors are fixed to a side plate of the upper case.

11. The manufacturing method of the power supply unit according to claim 7, wherein the wall extending from the top plate is integrally formed with the upper case.

12. The manufacturing method of the power supply unit according to claim 7, wherein the wall extending from the top plate is formed by a sheet member made of resin.

13. The power supply unit according to claim 1, wherein a height from an inner surface of the top plate to a lower end of the wall extending from the top plate is greater than each of respective heights from the inner surface of the top plate to lower ends of the substrates.

14. The power supply unit according to claim 1, wherein along a lateral direction of the power supply unit, a length of the wall extending from the top plate is greater than each of respective lengths of the substrates along the lateral direction.

15. The manufacturing method of the power supply unit according to claim 7, wherein a height from an inner surface of the top plate to a lower end of the wall extending from the top plate is greater than each of respective heights from the inner surface of the top plate to lower ends of the substrates.

16. The manufacturing method of the power supply unit according to claim 7, wherein along a lateral direction of the power supply unit, a length of the wall extending from the top plate is greater than each of respective lengths of the substrates along the lateral direction.

* * * * *